(12) United States Patent
Wilson

(10) Patent No.: US 7,249,780 B1
(45) Date of Patent: Jul. 31, 2007

(54) AIR ASSIST ADAPTATION FOR LEAF SPRING SUSPENSION SYSTEMS

(76) Inventor: Paul G. Wilson, 6731 Bridge St. #225, Fort Worth, TX (US) 76112

( * ) Notice: Subject to any disclaimer, the term of this patent is extended or adjusted under 35 U.S.C. 154(b) by 331 days.

(21) Appl. No.: 10/976,297

(22) Filed: Oct. 27, 2004

Related U.S. Application Data

(60) Provisional application No. 60/515,061, filed on Oct. 28, 2003.

(51) Int. Cl.
*B60G 5/047* (2006.01)
(52) U.S. Cl. .............................. 280/676; 280/124.163; 267/262
(58) Field of Classification Search ............ 280/5.514, 280/124.112, 124.163, 678, 680, 682, 683, 280/686; 267/31, 262
See application file for complete search history.

(56) References Cited

U.S. PATENT DOCUMENTS

| | | | | |
|---|---|---|---|---|
| 2,299,392 A * | 10/1942 | Frank et al. | ................ | 267/264 |
| 2,321,864 A * | 6/1943 | Schoenrock | ................ | 280/686 |
| 2,451,293 A * | 10/1948 | Long | .......................... | 280/682 |
| 2,811,213 A * | 10/1957 | Miller | ..................... | 180/24.12 |
| 3,066,929 A * | 12/1962 | Gregoire | ..................... | 267/31 |
| 3,166,341 A * | 1/1965 | Flowers | ..................... | 280/682 |
| 3,304,096 A * | 2/1967 | Hanover | ..................... | 280/682 |
| 3,499,660 A * | 3/1970 | Raidel | ........................ | 280/682 |
| 3,929,347 A * | 12/1975 | Masser | ...................... | 280/676 |
| 4,033,608 A | 7/1977 | Sweet et al. | | |
| 4,109,811 A * | 8/1978 | Stucky | ........................ | 414/495 |
| 4,225,152 A * | 9/1980 | Eaton | .................. | 280/124.163 |
| 4,397,478 A * | 8/1983 | Jensen et al. | ............ | 280/6.159 |
| 4,676,523 A * | 6/1987 | Rogers | ....................... | 280/682 |
| 4,998,749 A * | 3/1991 | Bockewitz | ............... | 280/6.159 |
| 5,024,462 A * | 6/1991 | Assh | .......................... | 280/680 |
| 5,129,633 A * | 7/1992 | Walton et al. | ................ | 267/45 |
| 5,351,986 A | 10/1994 | Hedenberg et al. | | |
| 5,464,245 A | 11/1995 | Vogler | | |
| 5,560,641 A | 10/1996 | Vogler | | |
| 6,247,689 B1 * | 6/2001 | Haesle et al. | ............... | 267/271 |
| 6,454,283 B1 * | 9/2002 | Fenton | ................ | 280/124.163 |
| 6,651,995 B1 | 11/2003 | Buettner | | |
| 6,959,932 B2 * | 11/2005 | Svartz et al. | ............ | 280/5.514 |

* cited by examiner

*Primary Examiner*—Paul N. Dickson
*Assistant Examiner*—Laura B. Freedman
(74) *Attorney, Agent, or Firm*—Susan L. Firestone; Paul W. O'Malley

(57) ABSTRACT

An air spring and a linear guide are used to boost the effectiveness of a leaf spring suspension system for a motor vehicle. The air spring mounts between the axle and the vehicle frame. The aft end of the leaf spring mounts to the linear guide to allow the leaf spring to move vertically as well as front and back while restricting side-to-side movement. The air spring and linear guide can be added during vehicle assembly or afterward from an aftermarket kit of parts.

13 Claims, 7 Drawing Sheets

AIR ASSIST ADAPTATION FOR LEAF SPRING SUSPENSION SYSTEMS

PRIORITY

The present application claims the benefit of U.S. Provisional Application No. 60/515,061 filed on Oct. 28, 2003.

BACKGROUND OF THE INVENTION

1. Field of the Invention

The invention relates to the addition of a supplemental air spring and linear guide to a leaf spring suspension system for vehicles and a kit of parts for adapting vehicles after assembly.

2. Description of the Prior Art

Vehicles such as light trucks or sport utility vehicles generally have relatively large suspension travel for use over rough and unimproved surfaces. While such vehicles have found favor among the general public for recreational purposes, they are also widely used by construction firms, the military, and other users as well.

The two most important considerations in the suspension action of such vehicles are total travel or the amount of movement from full compression ("bump") to full extension ("droop"), and articulation. This total travel is the difference in travel extremes between diagonally opposite wheels or wheel assemblies at diagonally opposite corners of the vehicle. These characteristics are of critical importance in extreme conditions, as obviously a wheel and tire which is not in contact with the underlying surface, is incapable of providing any tractive force (acceleration, braking, and/or steering) to propel and control the vehicle.

As a result, manufacturers and aftermarket suppliers alike have attempted to develop various solutions for these travel and articulation problems. As suspension travel increases in any given vehicle, the problem of providing sufficient articulation becomes more critical. Greater suspension travel results in greater angularity in drive lines and axles relative to one another and to the vehicle frame, creating an even greater problem in avoiding binding somewhere in the system.

This is particularly true in vehicles with solid axle systems, where the suspension elements (springs and shock absorbers) are connected between an axle which extends across the vehicle and the vehicle chassis or frame. A large number of vehicles (particularly older vehicles) have solid axles (perhaps front and back) suspended by leaf springs, as this system has proven to be extremely durable and reliable.

While leaf spring suspensions have a long history of use, leaf spring suspensions are a static or fixed suspension system. Leaf springs are elongated members used as a flexible beam to support the weight of a motor vehicle. In the suspension system of a vehicle, leaf springs provide a simple, cost-effective, and easy to design suspension system. The leaf spring suspension system can provide support without assistance from other structural components acting in parallel to them. Leaf springs provide full support for the suspended structure in vertical directions and can also provide full support for the suspended structure in lateral and longitudinal directions.

The use of only leaf springs in a vehicle's suspension system to support the weight of the suspended structure, however, has disadvantages as compared to the use of other types of springs. Leaf spring assemblies are conventionally formed of a series of separate springs of different lengths, laminated together by a corresponding series of shackles or the like. As the aft ends of the spring are secured to the vehicle by lateral pivot bolts or pins, the aft ends maintain the angular orientation of the vehicle about their lateral pivot axes, while the center of the spring, which is bolted to the axle, is twisted to align with the lateral angle of the axle. This twisting alignment twists the spring assembly, with resulting binding and resistance to spring travel and movement. The twisting alignment also places severe shear forces at the ends of the spring-to-chassis attachment bolts, leading to their early failure. Leaf springs also weigh more than other types of springs with equivalent weight carrying capabilities. Many factors, such as weight carrying requirements, limitations in the length of leaf springs due to space constraints and fatigue strength of the leaf springs, often require that leaf springs have greater spring rates than is necessary for other types of springs. The greater spring rates can result in a harsher ride for the occupants and cargo of the vehicle and reduced life of the suspended structure.

Additionally, many known designs of suspension systems of vehicles include leaf-spring packs with multiple leaf springs stacked upon one another to provide the load carrying ability. One disadvantage of the use of leaf-spring packs is that friction between a leaf spring and the leaf springs positioned above and below causes hysteresis in the reaction of the leaf-spring pack to changing loads. This hysteresis has the same negative consequences for suspension systems as the negative consequences associated with increased spring rates.

Therefore, there is a need for a suspension system that increases spring rates of a leaf spring suspension system while avoiding the harsher ride and reduced life of the suspended structure. There is also a need for an adjustable suspension system that incorporates the advantages of the leaf spring system but is readily adjustable, such as for use with different weights and types of cargo or for hauling a heavy trailer. A further need is an aftermarket kit that can be added to motor vehicles with existing leaf spring suspension systems to increase the effectiveness of the leaf spring suspension system.

SUMMARY OF THE INVENTION

A leaf spring suspension system for a motor vehicle is supplemented with an air spring and a linear guide block. The suspension system includes a vehicle frame, an axle transverse to the vehicle frame and having a top and a bottom, an air spring mounted to the vehicle frame and the top of the axle and a leaf spring located beneath the axle. The leaf spring has opposite fore and aft ends and a midsection.

A spring mount is attached to the aft end of the leaf spring. The spring mount has a pin and wear buttons located at opposite ends of the pin. The wear buttons of the spring mount slidably contact the inner walls of a linear guide and can move in the vertical direction. The linear guide has a base and a block extending from the base. The inner walls are located within the block.

In another embodiment, the suspension system has an air spring mounted to the vehicle frame and the top of the axle. The leaf spring has opposite fore and aft ends and a midsection being located under the axle.

A linear guide attaches to the vehicle frame. The linear guide has a base, and upper and lower blocks, a slider and a guide pin. The upper and lower blocks extend toward the trailing leaf spring from the base. The upper block has a stem slot. The lower block has a head slot.

The slider has a member and two arms extending from the member. The two arms attach to the aft end of the leaf spring. The member has a hole located opposite the arms.

The guide pin has a stem and a head. The head has an eye. The head is adapted to pivotally fit within the head slot of the lower block. The stem is adapted to fit within the stem slot of the upper block and within the hole of the member.

Another embodiment of the invention is a kit of parts for adapting a leaf spring suspension system with an air spring and linear guide. The linear guide is adapted to mount to the vehicle frame. The linear guide includes a base with upper and lower blocks, a slider and a guide pin. The slider is adapted to attach to the aft end of the leaf spring. The guide pin is adapted to engage the slider and a block.

Additional effects, features and advantages will be apparent in the written description that follows.

DETAILED DESCRIPTION OF THE INVENTION

Figure 1:
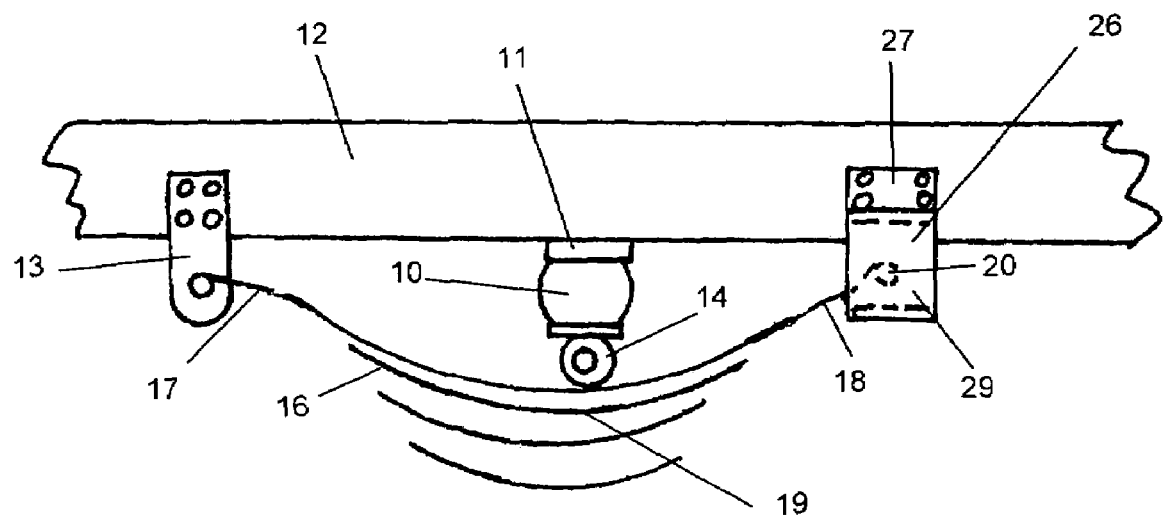
FIG. 1 is side view of an embodiment of the invention.

Turning to the Figures, where like reference numerals refer to like structures, a leaf spring suspension system is modified by the addition of at least one air spring and a linear guide block. A motor vehicle has vehicle frame 12 and transverse axle 14. Leaf spring 16 supports both the vehicle frame 12 and axle 14 on each side of the vehicle. Air spring 10 mounts between vehicle frame 12 and axle 14 with air spring mounts 11, such as brackets and fasteners. In this manner, the mounted air spring 10 assists the leaf spring suspension system. Air spring 10 preferably mounts above the leaf spring.

Leaf spring 16 has opposite fore 17 and aft 18 ends. Fore end 17 attaches to vehicle frame 12 with fore bracket 13. Aft end 18 of leaf spring 16 attaches to linear guide 26 with spring mount 20 having pin 24 and wear buttons 22 at each end of pin 24. Midsection 19 of leaf spring 16 is located under axle 14.

Linear guide 26 has base 27. Block 29 extends from base 27 and has inner walls 28 within block 29 defining chamber 38 which receives spring mount 20. Wear buttons 22 of spring mount 20 slide up and down inner walls 28 to allow leaf spring 16 to slide up and down, depending on the amount of air present in air spring 10. If desired, inner walls 28 can have channels for receiving wear buttons 22 (not shown). Linear guide 26 attaches to vehicle frame 12 rearward to air spring 10 either directly to vehicle frame 12 at upper end 30 of base 27 or indirectly with the use of a hanger attached to the base.

Figure 3:
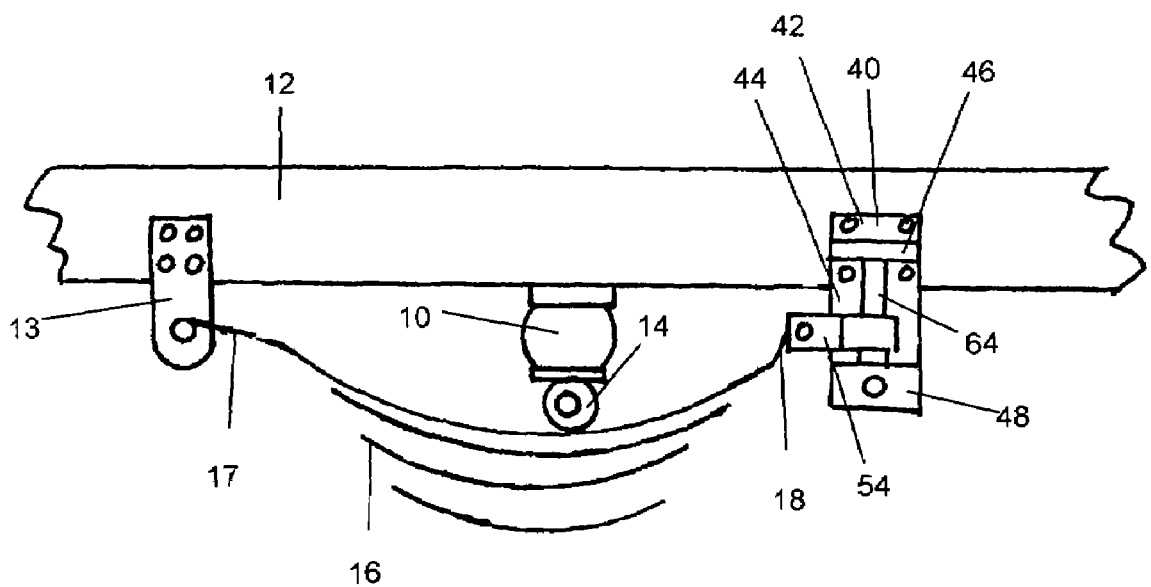
FIG. 3 is a side view of an embodiment of the invention.
Figure 2:
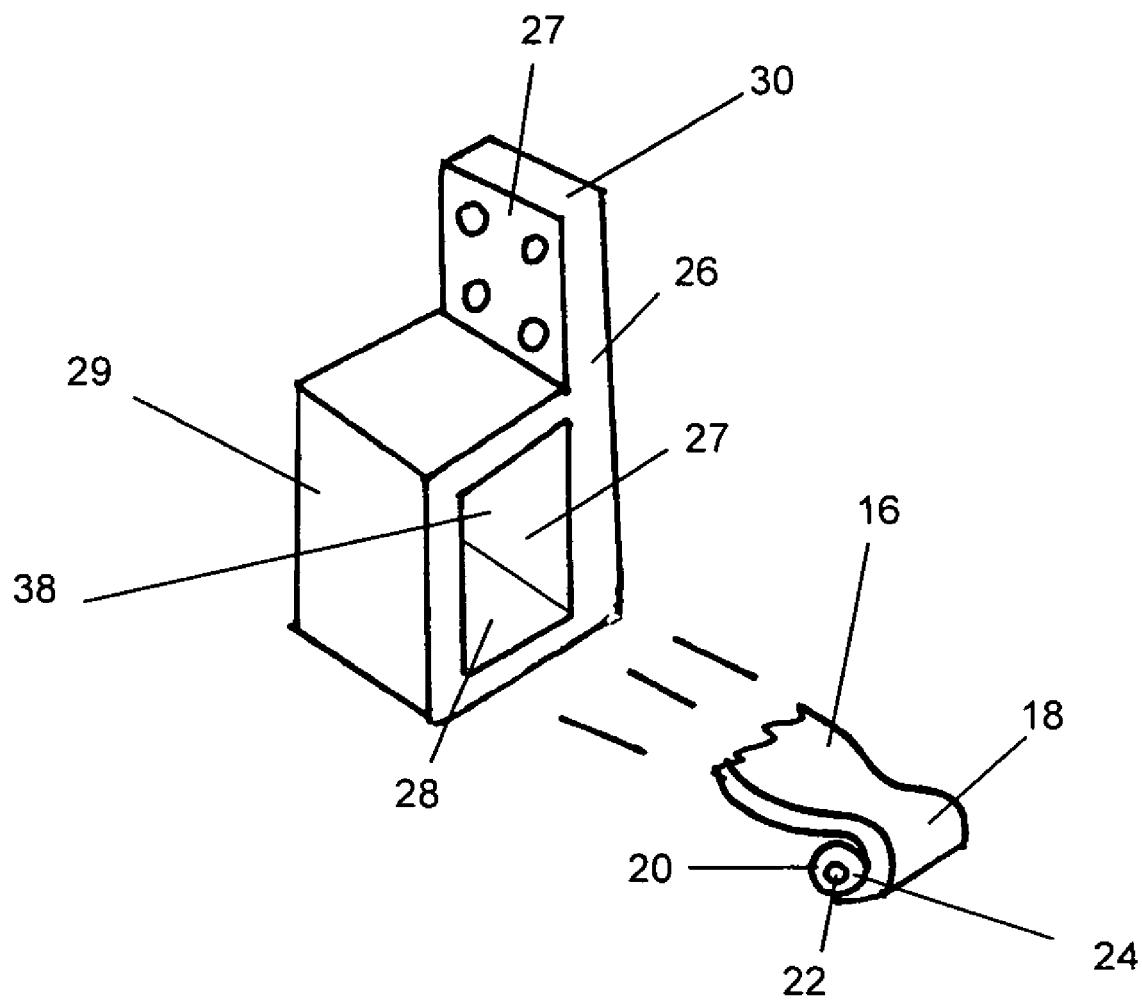
FIG. 2 is partially exploded perspective view of a guide block and an aft spring end of the invention.
Figure 4:
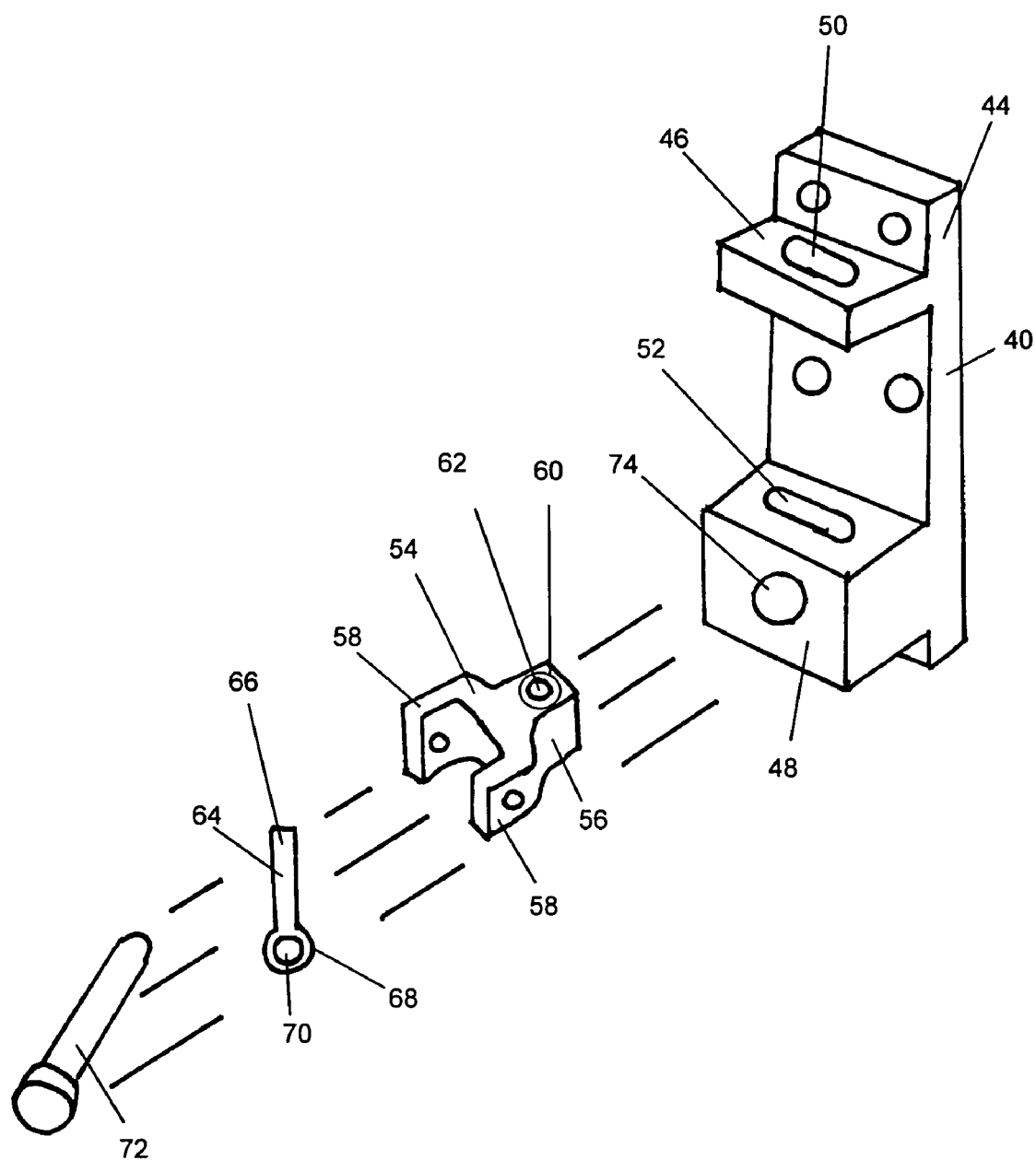
FIG. 4 is an exploded perspective view of a linear guide and slider of the invention.

In the embodiment shown in FIGS. 3 and 4, leaf spring 16 attaches to vehicle frame 12 with fore bracket 13 at fore end 17 and to linear guide 40 at aft end 18. Linear guide 40 guides the movement of leaf spring 16 linearly in the vertical direction and allows leaf spring 16 to pivot. Linear guide 40 has retainer base 44. Upper 46 and lower 48 blocks extend outwardly from retainer base 44. Upper block 46 has stem slot 50 and lower block 48 has head slot 52. Linear guide 40 fastens to vehicle frame 12 at upper end 42 either directly to vehicle frame 12 or indirectly through the use of a hanger.

Fitting between upper 46 and lower 48 blocks is Y-shaped slider 54. Slider 54 has member 56 and two arms 58 extending from member 56. Aft end 18 of leaf spring 16 attaches to each arm 58 either directly or attaches to pin 61, which in turn attaches to arms 58. A bearing 62 or a bushing lies within hole 60 of member 56.

Guide pin 64 holds slider 54 within linear guide 40. Guide pin 64 has stem 66 and head 68 with eye 70. Head 68 pivotally fits within head slot 52 of lower block 48. Pivot pin 72 inserts within pivot bore 74 of lower block 74 and into eye 70. Stem 66 extends through bearing 62 within hole 60 of slider 54 and into stem slot 50 of upper block 46. Slider 54 can thus move vertically along stem 66 during use.

Figure 5:
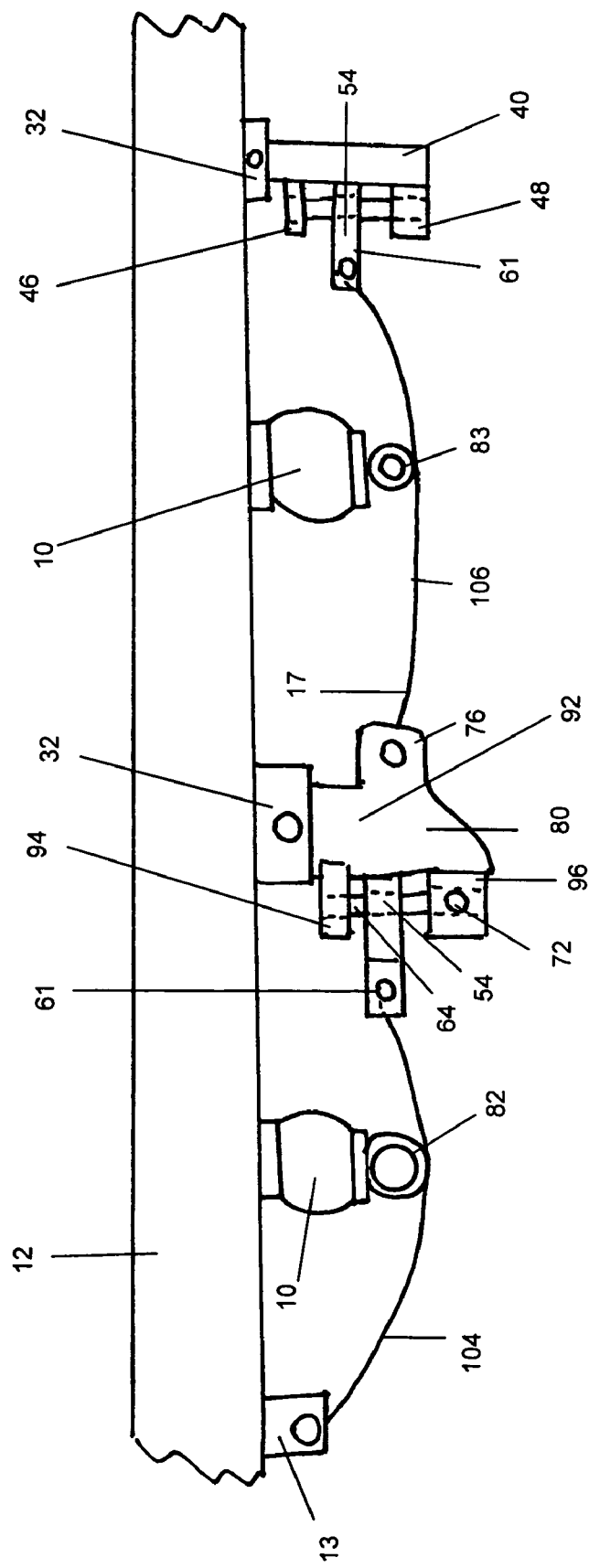
FIG. 5 is side view of an embodiment of the invention with tandem axles.

FIG. 5 shows the use of air springs 10 with tandem axles 82, 83. In this embodiment, dual 80 and single linear guides 40 are shown mounted to vehicle frame 12 using hanger 32. Hanger 32 extends from vehicle frame 12 and attaches to linear guides 80, 40.

Figure 6:
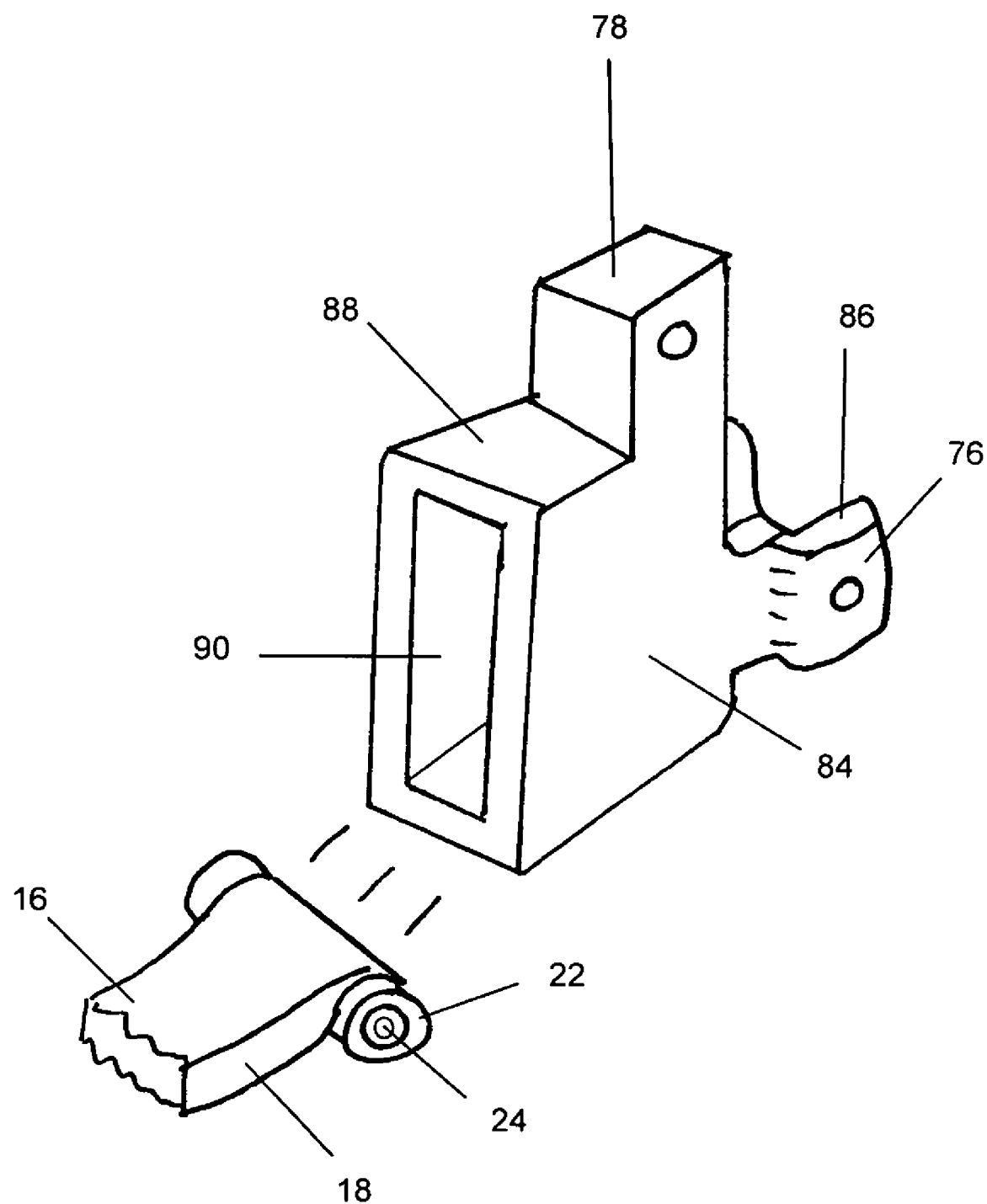
FIG. 6 is a partial exploded view of a guide block and aft spring end of the invention.

Dual linear guide 78 of FIG. 6 has trailing axle spring mount 76 projecting rearward from dual base 84 and is preferably defined by two curved branches 86. Dual base 84 has open block 88 that extends from base 84 and has inner walls 90 within block 88. Because dual linear guide 78 attaches to two leaf springs, dual base 84 is preferably thicker than base 27 of single linear guide 26. As in single linear guide 26, wear buttons 22 of spring mount 20 slide up and down inner walls 90. The fore end 17 of the trailing axle leaf spring 106 attaches to linear guide 78 at the trailing axle spring mount 76.

Figure 7:
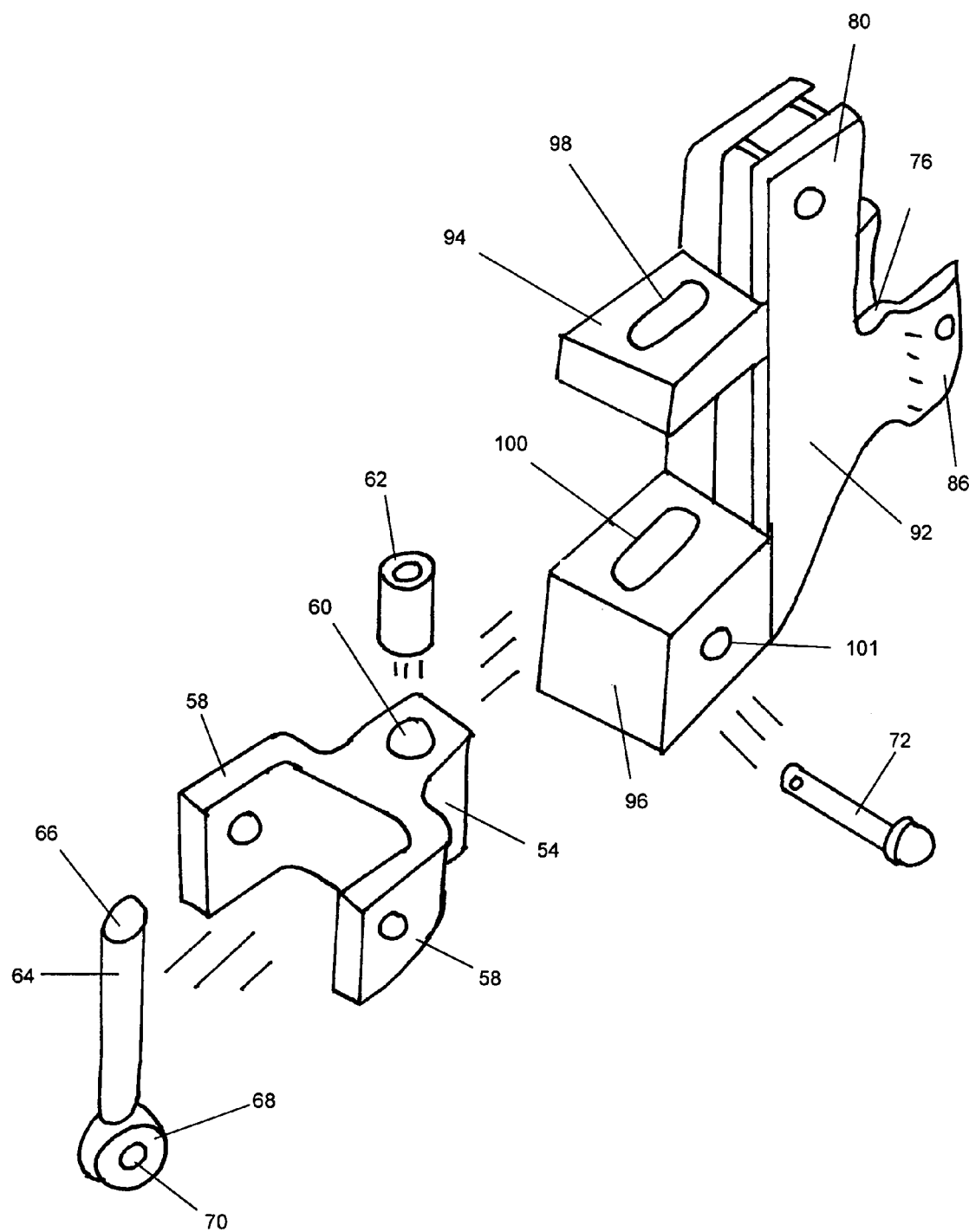
FIG. 7 is an exploded view of a linear guide and slider of the invention.

Dual linear guide 80 of FIG. 7 also has trailing axle mount 76 projecting rearward from dual retainer base 92 and preferably has two curved branches 86. Because dual linear guide 80 attaches to two leaf springs, dual retainer base 92 is preferably thicker than base 44 of single linear guide 40. As in single linear guide 40, dual linear guide 80 has upper 94 and lower 96 blocks which are spaced apart to receive linear guide pin 64 and slider 54. Upper block 94 has stem slot 98 which receives stem 66 of linear guide pin 64. Lower block 96 has head slot 100 which receives head 68 of linear guide pin 64, and pivot bore 101 which receives pivot pin 72. Slider 54 moves vertically on linear guide pin 64.

When using tandem axles 82, 83, aft end 18 of leading leaf spring 104 attaches to one of the dual mounting linear guides 78, 80. Aft end 18 of trailing leaf spring 106 attaches to one of the single mounting linear guides 26, 40. Fore end 17 of trailing leaf spring 106 attaches to trailing axle spring mount 76 of linear guide 78, 80. Fore end 17 of leading leaf spring 104 attaches to fore bracket 13.

Preferably the air spring mounts directly above the axle with sufficient clearance for operation of the air spring. The use of the linear guides ensures the leaf spring travels in a vertical path only.

Figure 8:
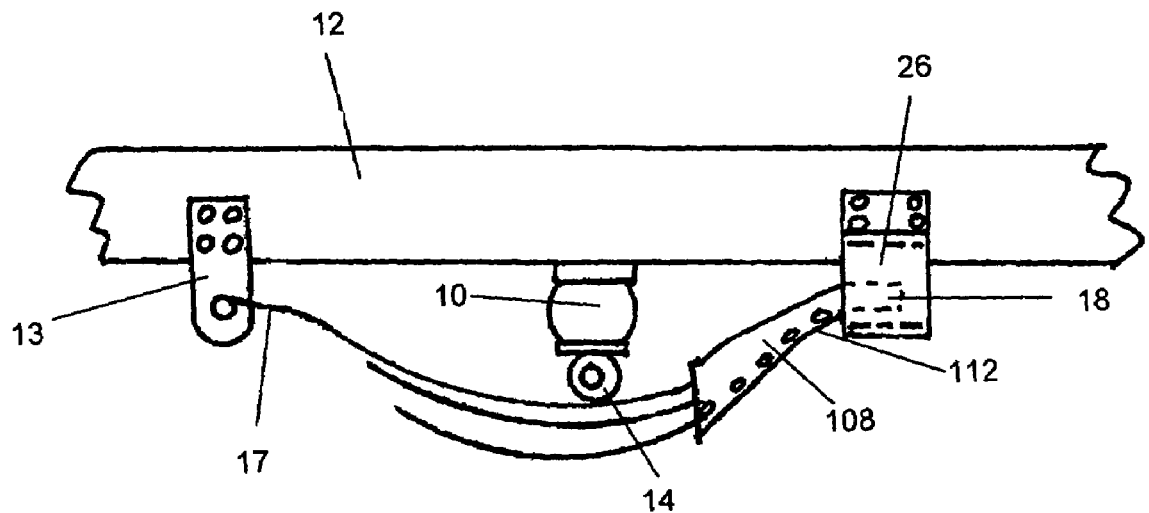
FIG. 8 is a side view of an embodiment of the invention with a spring adaptor.
Figure 9:
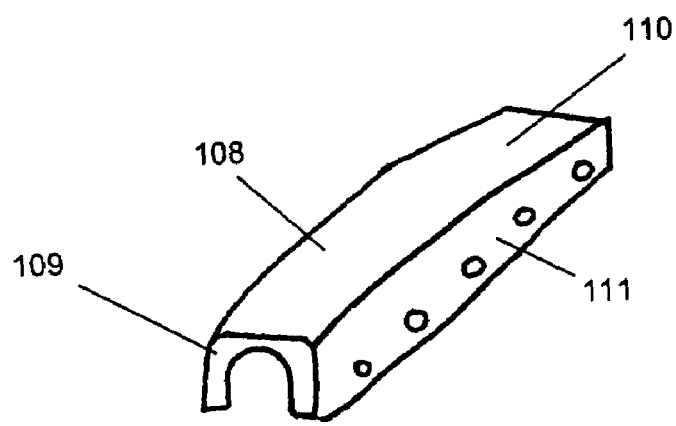
FIG. 9 is a perspective view of an adaptor of the invention.

If the change in geometry of the leaf spring in the relaxed state cannot function as a beam, the tension of the leaf spring can be adjusted. As shown in FIG. 8, the leaf spring tension is adjusted by fitting sleeve 108 onto at least a portion of leaf spring 16 between the midsection 19 and the aft end 18 to provide additional support to leaf spring 16. Sleeve 108 has three sides 109, 110, 111. Sleeve 108 is preferably curved with sides 109, 111 decreasing in height to match the dimensions of aft end 18 of leaf spring 16. After fitting aft end 18 of leaf spring 16 into sleeve 108 between sides 109, 110, 111, fasteners 112 are used to extend between opposite sides 109, 111 and hold leaf spring 16 within sleeve 108. Aft end 18 of leaf spring 16 now attaches to one of the linear guides as discussed previously.

The invention can also include an air spring adapter kit of parts for use after vehicle assembly, especially for aftermarket use. The kit includes the unassembled linear guide 40, and if desired, the air spring and air spring mounting brackets. The kit can also include the sleeve 108. The kit allows a mechanic to adapt older vehicles to boost the load carrying capacity of the leaf spring suspension system in order to carry heavier loads without causing hysteresis and a harsher ride.

There are a number of advantages to the invention. Simply changing the design of the linear guide allows installation of the linear guide for multiple axles. Where slipper springs are used, a mechanic can easily replace the aft anchor point of the suspension with the linear guide of the invention.

Tandem axles typically use a modified equalizer toggle mount. Substituting a dual linear guide provides rigid attachment of the trailing axle's leaf springs when the dual linear guide is installed along with the air springs for the forward axle. For the trailing axle, the replacement dual linear guide provides the forward anchor point for the leaf springs of that axle and a single linear guide is placed aft the leaf springs of the trailing axle. Air springs mounted to the second axle further improve the vehicle's suspension. A mechanic can easily make the substitution of the toggle mount with the dual linear guide and the addition of the air spring.

With vehicles having more than a tandem set of axles, additional dual linear guides are used at all connecting points where the equalizer toggles are positioned. The linear guide of the aft most axle does not need an anchor point for a leaf spring and thus a single linear guide is used.

Furthermore, the use of both an air spring and a linear guide allows vertical travel and some front and back movement of the leaf spring while restricting side-to-side movement of the aft end of the leaf spring. This combination allows the leaf spring to swivel or rotate about the forward fixed attachment point.

Another advantage the ease of installation of the air spring and the linear guide as an aftermarket addition. When a leaf spring gives insufficient support to heavy loads or extreme conditions, especially in an older vehicle, the linear guide is easily installed to the leaf spring and the air spring is easily installed between the axle and the vehicle frame or chassis.

While the invention is shown in only one of its forms, it is not thus limited but is susceptible to various changes and modifications without departing from the spirit and scope of the invention.

What is claimed is:

1. A suspension system for a motor vehicle with a vehicle frame, and a transverse axle, comprising:
    an air spring being mounted to the vehicle frame and on top of the axle;
    a leaf spring having opposite fore and aft ends and a midsection being located under the axle;
    a linear guide being attached to the vehicle frame, the linear guide having a base, and upper and lower blocks extending toward the leaf spring from the base;
    a stem slot in the upper block;
    a head slot in the lower block;
    a slider having a member, and two arms extending from the member and attaching to the aft end of the leaf spring;
    a hole in the member opposite the arms;
    a guide pin having a stem, and a head;
    the head having an eye and being adapted to pivotally fit within the head slot of the lower block; and
    the stem being adapted to fit within the stem slot of the upper block and within the hole of the member.

2. A suspension system for a motor vehicle with a vehicle frame, and a transverse axle of claim 1, wherein the slider moves vertically on the stem.

3. A suspension system for a motor vehicle having a vehicle frame, and a transverse axle of claim 2, wherein the linear guide further comprises:
    a trailing axle spring mount projecting rearward from base.

4. A suspension system for a motor vehicle having a vehicle frame, and a transverse axle of claim 3, wherein the trailing axle spring mount further comprises:
    two curved branches projecting rearward from base.

5. A suspension system for a motor vehicle having a vehicle frame, and a transverse axle of claim 4, further comprising:
    a trailing leaf spring having opposite fore and aft ends, the fore end being attached to the two curved branches of the trailing spring mount;
    a second linear guide being attached to the vehicle frame, the second linear guide having a base, and upper and lower blocks extending toward the trailing leaf spring from the base;
    a stem slot in the upper block of the second linear guide;
    a head slot in the lower block of the second linear guide;
    a second slider having a member, and two arms extending from the member and attaching to the aft end of the trailing leaf spring;
    a hole in the member opposite the arms of the second slider;
    a second guide pin having a stem, and a head;
    the head having an eye and being adapted to pivotally fit within the head slot of the lower block of the second linear guide; and
    the stem of the second guide pin being adapted to fit within the stem slot of the upper block and within the hole of the member of the second linear guide.

6. A suspension system for a motor vehicle having a vehicle frame, and a transverse axle of claim 2, further comprising:
    a hanger connecting the linear guide to the vehicle frame.

7. A suspension system for a motor vehicle having a vehicle frame, and a transverse axle of claim 2, further comprising:
    a sleeve fitting over at least a portion of the leaf spring between the midsection and the aft end.

8. A kit of parts capable of being assembled to be used with a leaf spring suspension system of a motor vehicle having a vehicle frame, a transverse axle, and a leaf spring having opposite fore and aft ends and a midsection being located under the axle, comprising:
    a linear guide adapted to mount to the vehicle frame, the linear guide having a base, and upper and lower blocks extending from the base;
    a stem slot in the upper block;
    a head slot in the lower block;

a slider having a member, and two arms extending from the member and adapted to attach to the aft end of the leaf spring;

a hole in the member opposite the arms;

a guide pin having a stem, and a head;

the head having an eye and adapted to pivotally fit within the head slot of the lower block; and the stem adapted to fit within the stem slot of the upper block and within the hole of the member.

9. A kit of parts capable of being assembled to be used with a leaf spring suspension system of claim 8, wherein the linear guide further comprises:

a trailing axle spring mount projecting rearward from base.

10. A kit of parts capable of being assembled to be used with a leaf spring suspension system of claim 9, wherein the trailing axle spring mount further comprises:

two curved branches projecting rearward from base.

11. A kit of parts capable of being assembled to be used with a leaf spring suspension system of claim 8, further comprising:

a hanger adapted to connect the linear guide to the vehicle frame.

12. A kit of parts capable of being assembled to be used with a leaf spring suspension system of claim 8, further comprising:

a sleeve adapted to fit over at least a portion of the leaf spring between the midsection and the aft end.

13. A kit of parts capable of being assembled to be used with a leaf spring suspension system of claim 8, further comprising:

an air spring; and air spring mounts adapted to mount the air spring to the axle and the vehicle frame.

* * * * *